United States Patent [19]

Hertel et al.

[11] Patent Number: 5,449,273
[45] Date of Patent: Sep. 12, 1995

[54] COMPOSITE AIRFOIL LEADING EDGE PROTECTION

[75] Inventors: Christopher J. Hertel, Glastonbury; Charles R. Watson, Windsor; Sol S. Blecherman, Newington; Gary M. Lomasney, New Britain, all of Conn.

[73] Assignee: United Technologies Corporation, Hartford, Conn.

[21] Appl. No.: 171,307

[22] Filed: Mar. 21, 1994

[51] Int. Cl.$^6$ ............................................. F01D 5/14
[52] U.S. Cl. .................. 416/224; 416/229 A; 29/889.71; 205/271
[58] Field of Search ............ 416/224, 241 R, 229 A; 29/889.7, 889.71; 425/250; 205/271

[56] References Cited

U.S. PATENT DOCUMENTS

| | | | |
|---|---|---|---|
| 1,367,132 | 2/1921 | Frederick | 416/230 |
| 1,674,674 | 6/1928 | Wooster | 416/224 |
| 1,860,557 | 5/1932 | Sukohl | 416/224 |
| 2,161,533 | 6/1939 | Scholz et al. | 170/159 |
| 2,477,375 | 7/1949 | Jablonsky | 154/110 |
| 2,644,296 | 7/1953 | Sanz et al. | 60/35.6 |
| 2,767,461 | 10/1956 | Lebold et al. | 29/156.8 |
| 2,897,583 | 8/1959 | Patrichi | 29/155.5 |
| 2,994,124 | 8/1961 | Denny et al. | 416/229 A |
| 3,041,040 | 6/1962 | Levinstein | 253/77 |
| 3,294,366 | 12/1966 | Coplin | 253/77 |
| 3,572,971 | 3/1971 | Seiwert | 416/230 |
| 3,600,103 | 8/1971 | Gray et al. | 416/224 |
| 3,602,608 | 8/1971 | Morley | 416/224 |
| 3,637,325 | 1/1972 | Morley | 416/230 |
| 3,645,829 | 2/1972 | Palfreyman et al. | 156/441 |
| 3,649,865 | 3/1972 | Holmes | 313/350 |
| 3,701,190 | 10/1972 | Stone, Jr. | 29/156.8 |
| 3,758,234 | 9/1973 | Goodwin | 416/230 |
| 3,762,835 | 10/1973 | Carlson et al. | 29/889.71 |
| 3,880,727 | 4/1975 | Jürging et al. | 205/271 |
| 3,883,267 | 5/1975 | Baudier et al. | 416/230 |
| 3,892,612 | 7/1975 | Carlson et al. | 156/150 |
| 4,000,956 | 1/1977 | Carlson et al. | 416/230 |
| 4,006,999 | 2/1977 | Brantley et al. | 416/224 |
| 4,111,606 | 9/1978 | Prewo | 416/224 |
| 4,492,522 | 1/1985 | Rossmann et al. | 416/229 A |
| 4,795,313 | 1/1989 | Coulon | 416/224 |
| 4,944,655 | 7/1990 | Merz | 416/61 |
| 5,174,024 | 12/1992 | Sterrett | 29/889.71 |
| 5,210,944 | 5/1993 | Monson et al. | 29/889.7 |

FOREIGN PATENT DOCUMENTS

| | | | |
|---|---|---|---|
| 0928637 | 6/1973 | Canada | 416/224 |
| 0123786 | 7/1984 | Japan | 205/271 |

OTHER PUBLICATIONS

United Technologies Corporation Invention Disclosure "Composite Airfoil Leading Edge Protection" submitted by Christopher J. Hertel, Charles R. Watson, Sol S. Blecherman, Gary M. Lomasney, 2 pages.

Primary Examiner—Edward K. Look
Assistant Examiner—Mark Sgantzos
Attorney, Agent, or Firm—Charles E. Sohl

[57] ABSTRACT

Methods for improving the erosion resistance of composite airfoils are disclosed as are the resultant structures. Wire mesh materials are coated with an erosion-resistant coating, formed to the shape of the airfoil leading edge, and molded into the leading edge during airfoil fabrication.

5 Claims, 1 Drawing Sheet

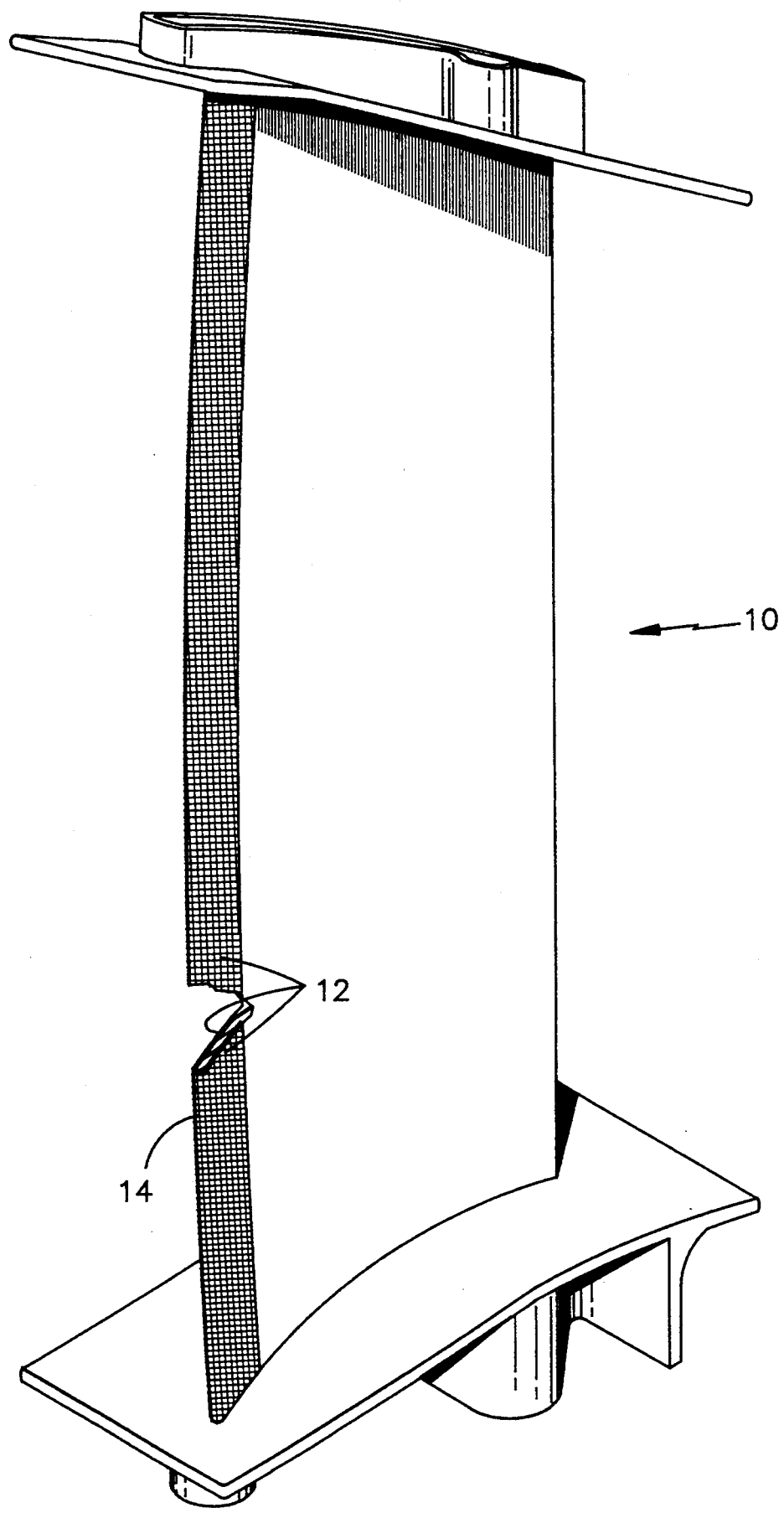

COMPOSITE AIRFOIL LEADING EDGE PROTECTION

TECHNICAL FIELD

This invention relates to composites, and more particularly to a method for improving the erosion resistance of composite components employed in gas turbine engines.

BACKGROUND ART

Engine weight is an important factor when considering the overall cost and performance of a gas turbine engine. For many years attempts have been made to decrease the overall weight of the engine while maintaining or improving engine performance. One manner in which researchers have attempted to reduce the overall weight of the engine is by utilizing composite airfoils in place of the metal airfoils currently employed in most gas turbine engines. Composite airfoils offer a significant weight savings over metal airfoils, however, composite materials have inherently poor resistance to foreign object damage (FOD).

Many types of foreign objects may be entrained in the inlet airflow of an aircraft gas turbine engine ranging from large birds, such as sea gulls, to hailstones, rain, sand, and dust. Damage from foreign objects generally takes two forms. Smaller objects can erode the blade material, causing the aerodynamic shape to change, and degrade the performance of the compressor. Impact by larger leading edge objects can dent or deform the blades. Portions of an impacted blade can also be torn loose and cause secondary damage to downstream blades and other engine components.

The consequences of foreign object damage are greatest in the fan and low pressure compressor sections of turbine engines. However, these components offer the greatest potential in weight reduction due to their large tip diameters, as great as eight feet, and spans in the order of two or more feet.

The vulnerability of composite blades to foreign object damage is due to two factors. First the lightweight matrix materials employed, generally polymeric resins or metals such as aluminum, are relatively soft and do not have high tensile strengths. Second, the high-strength filaments employed in such composites are relatively hard and brittle. As a result, the matrix material is subject to erosion and the fibers are subject to breakage upon foreign object impact.

From this it would appear that some sort of protection system should be provided for these composite blades and vanes. Many such protection systems have been proposed. They include claddings of various compositions applied to the leading edge portion of the entire surface of the blade. One proposed cladding system involves fixing a solid metal sheath over the leading edge of the blade. This procedure, however, requires expensive forming operations and the sheath must ultimately be adhesively bonded to the airfoil as a secondary operation after airfoil manufacture. This process proves to be both costly and time consuming. In addition, solid metal sheaths require stringent surface preparation and priming prior to adhesive bonding, and are subject to environmental degradation of the adhesive bond when in operation. This naturally reduces the life of the protected composite airfoil.

Another proposed method for protecting the leading edge of composite blades and vanes is disclosed and claimed in U.S. Pat. No. 3,892,612, Method for Fabricating Foreign Object Damage Protection for Rotor Blades, Carlson et al. The disclosed and claimed method of U.S. Pat. No. 3,892,612 is directed to a complicated method of applying a protective metal coating to a non-conductive substrate which comprises the steps of (i) incorporating a woven wire mesh into the substrate, by means of a bonding agent which fills the interstices of the mesh, and then abrading the outer surface of the mesh layer to remove the adhesive from its nubs; (ii) applying a thin conductive layer to the bonding agent in the interstices of the mesh with the mesh nubs free of the thin conductive layer; and (iii) electrolytically depositing a metal coating on the wire mesh/conductive layer surface to obtain an essentially uniform thickness coating forming a metallic strip. The above steps are both complicated and time consuming. In addition, it is noted in a later U.S. Pat. No. 4,006,999 entitled, Leading Edge Protection for Composite Blades, Brantley et al., that a metallic strip leading edge protection created by the aforementioned method has demonstrated problems with delamination when impacted by medium-sized birds. This problem, according to the assignee, can result in secondary engine damage as the leading edge protection strip is ingested through the engine and, in addition, engine imbalance at high speeds can cause further damage.

DISCLOSURE OF INVENTION

It is an object of the present invention to provide an improved method for protecting the leading edge of a composite blade against foreign object damage, such method being both cost-effective and easy to implement.

It is another object of the present invention to produce an improved method for providing durable protection for the leading edge of a composite airfoil so as to increase both the reliability and the longevity of the composite blade.

According to the present invention, a composite airfoil is made resistant to erosion and foreign object damage by a process which includes applying an erosion resistant coating to a mesh, conforming the coated mesh to the desired airfoil contour, and integrally molding the coated mesh into the composite airfoil so as to protect the aerodynamic shape and useful life of the airfoil. The mesh may be metal and should maintain an open construction at its interstices after the erosion resistant coating is applied, prior to molding. Keeping an open construction allows for resin infiltration from the composite lay-up during molding and provides a strong, durable, mechanical interlock between the composite and the mesh.

The foregoing and other objects, features, and advantages of the present invention will become ore apparent in the light of the following detailed description of exemplary embodiments thereof, as illustrated in the accompanying drawings.

BRIEF DESCRIPTION OF DRAWINGS

The FIGURE is a perspective view illustrating a composite airfoil with leading edge protection made in accordance with the present invention.

BEST MODE FOR CARRYING OUT THE INVENTION

Referring now to the FIGURE, a composite airfoil 10, in accordance with the present invention, includes a coated mesh 12 adjacent with the exterior portion of leading edge 14, the coated mesh being contoured abut the leading edge 14 of the airfoil 10 to protect the leading edge 14 against foreign object damage. This invention comprises the method for making the composite airfoil 10 with the coated mesh 12 leading edge 14 protection.

The method of this invention comprises the steps of applying an erosion-resistant coating to a mesh, conforming the coated mesh to the desired airfoil contour, and then integrally molding the coated mesh to the composite airfoil so as to protect the airfoil from erosion and other foreign object damage while also maintaining the aerodynamic shape of the airfoil.

In carrying out this invention, the mesh is preferably made of a material, such as stainless-steel, which is strong enough to provide the leading edge with enhanced protection against erosion, yet sufficiently pliant, and ductile, so as to be formable about the airfoil's leading edge, and to which an erosion-resistant coating will adhere. However, any other sufficiently strong and pliant material, such as carbon fibers, to which the erosion-resistant coating will adhere, may also be utilized.

One type of wire mesh useful with the present invention is a square, plain weave pattern mesh, although other types of mesh may also be utilized. In this type of mesh substantially parallel lengthwise wires are relatively perpendicular to substantially parallel crosswise wires. The lengthwise wires are typically referred to as warp wires, while the crosswise wires are typically referred to as weft wires. The warp wires pass over and then under successive weft wires and continue in an over one, under one pattern. A void area is formed by the intersection of two adjacent parallel warp wires with two adjacent parallel weft wires. This void area is useful because during the molding process resin infiltrates from the composite through the mesh voids to provide a strong, durable, mechanical interlock between the composite and the mesh. To provide the mesh with good mechanical strength without interfering with aerodynamic flow once the mesh is in place, the diameter of both the warp and weft wires should be in the range of about 3.0 mils to 5.0 mils, with about 4.5 mils being the preferred wire diameter. The above-described plain weave pattern mesh is known to those skilled in the art as a Plain Dutch Weave and may be purchased from a variety of companies, including INA Filtration Corporation of South Carolina.

Prior to securing the mesh to the composite airfoil the mesh is formed to the approximate contour of the leading edge and is coated with an erosion-resistant coating. If the coating is sufficiently ductile the mesh may be coated first and then formed to the approximate contour of the leading edge. If the mesh contains more weft wires than warp wires then it is preferred that the mesh be formed so that its warp wires will lie longitudinally along the airfoil's leading edge when the mesh is integrally molded to the airfoil.

The mesh is then coated on at least one side, with an erosion-resistant coating, such as electrolytic or electroless nickel, to a thickness of about 0.1 mils to 5.0 mils, with the preferred thickness being about 1.0 mils to 2.0 mils. Both sides of the mesh may be coated, but the side of the mesh which is placed in contact with the airfoil need not be coated. Other erosion-resistant coatings, such as titanium nitride and titanium diboride, which can be applied to a thickness of 0.1 mils to 5.0 mils in order to improve the mesh's durability, without adding excess weight or impacting the aerodynamic shape of the airfoil. When coating the mesh it is important to keep the void areas open, because during the molding process resin infiltrates from the composite airfoil, through the mesh to secure the mesh to the airfoil.

After the mesh is coated it is placed around the lay-up of a composite material which is impregnated with resin, and is formed and secured to the finished airfoil contour by compression molding. During compression molding resin infiltrates from the composite lay-up through the void areas of the mesh and provides a strong, durable interlock between the composite and the wire mesh. This eliminates the need for adhesive bonding which often involves stringent surface preparation and priming procedures of the mesh and/or airfoil.

Although this invention has been shown and described with respect to detailed embodiments thereof, it will be understood by those skilled in the art that various changes in form and detail thereof may be made without departing from the spirit and scope of the claimed invention. For example, while the invention is described with respect to compression molding, it will be understood that other composite processing methods such as resin transfer molding (RTM) and autoclave molding may be utilized.

We claim:

1. A method of making an erosion-resistant airfoil comprising the steps of impregnating the airfoil with resin, applying an erosion-resistant coating to a mesh prior to applying the mesh to the airfoil, thereby producing a coated mesh, the mesh having an open construction at its interstices after the erosion-resistant coating is applied, forming said coated mesh to contour about a leading edge of the airfoil, and integrally molding the mesh into the airfoil whereby the resin infiltrates from the airfoil through the mesh to secure the mesh to the airfoil.

2. The method of claim 1, wherein said erosion-resistant coating is electroless nickel.

3. The method of claim 1, wherein said erosion-resistant coating is electrolytic nickel.

4. The method of claim 3, wherein said electrolytic nickel is about 0.1 mils to 5.0 mils thick.

5. A composite airfoil which is resistant to foreign object damage comprising a metallic mesh molded about its leading edge, said metallic mesh having an erosion-resistant coating thereon, such that the mesh has an open construction at its interstices after the erosion-resistant coating is applied to the mesh prior to molding.

* * * * *